(12) United States Patent
Murray et al.

(10) Patent No.: US 11,691,825 B2
(45) Date of Patent: Jul. 4, 2023

(54) CONVEYOR PACKAGE-FLOW MEASURING SYSTEM

(71) Applicant: Laitram, L.L.C., Harahan, LA (US)

(72) Inventors: William S. Murray, New Orleans, LA (US); Jeremiah E. Oertling, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/897,430

(22) Filed: Aug. 29, 2022

(65) Prior Publication Data

US 2022/0411197 A1 Dec. 29, 2022

Related U.S. Application Data

(63) Continuation of application No. 17/262,545, filed as application No. PCT/US2019/041220 on Jul. 10, 2019, now Pat. No. 11,440,744.

(60) Provisional application No. 62/711,736, filed on Jul. 30, 2018.

(51) Int. Cl.
 *B65G 43/08* (2006.01)
 *G01B 11/245* (2006.01)

(52) U.S. Cl.
 CPC ...... *B65G 43/08* (2013.01); *B65G 2203/0241* (2013.01); *B65G 2203/042* (2013.01); *B65G 2811/095* (2013.01); *G01B 11/245* (2013.01)

(58) Field of Classification Search
 CPC ............ B65G 43/08; B65G 2203/0241; B65G 2203/042; B65G 2811/095; G01B 11/245
 See application file for complete search history.

(56) References Cited

U.S. PATENT DOCUMENTS

| | | | | |
|---|---|---|---|---|
| 4,905,512 A | | 3/1990 | Hayashi | |
| 4,962,538 A | * | 10/1990 | Eppler | G06M 7/10 250/222.2 |
| 5,141,097 A | * | 8/1992 | Oiry | B65G 47/31 198/444 |
| 5,165,520 A | * | 11/1992 | Herve | B07C 5/02 198/444 |
| 5,699,161 A | | 12/1997 | Woodworth | |

(Continued)

FOREIGN PATENT DOCUMENTS

| CN | 111307044 A | 6/2020 |
|---|---|---|
| DE | 41240094 A1 | 6/1994 |

(Continued)

OTHER PUBLICATIONS

Emza, Universal Counting and Measurement System, Feb. 5, 2009, WO2009/016614A2 (Year: 2009).*

(Continued)

*Primary Examiner* — Gene O Crawford
*Assistant Examiner* — Lester Rushin, III
(74) *Attorney, Agent, or Firm* — James T. Cronvich

(57) ABSTRACT

System and methods for estimating the number of packages in a measurement zone to gauge package flow. A linear array of distance-measuring sensors measures the height profile of a mass of packages conveyed past. The profile is differentiated, and steps in the differentiated profile are counted to detect package edges and to produce an estimate of the number of packages in the measurement zone. The estimate can be used to adjust the speed of the conveyor to provide a constant package flow.

17 Claims, 5 Drawing Sheets

(56) References Cited

U.S. PATENT DOCUMENTS

| | | | |
|---|---|---|---|
| 5,719,678 | A | 2/1998 | Reynolds et al. |
| 6,401,936 | B1 * | 6/2002 | Isaacs .................... B65G 43/08 |
| | | | 198/367.1 |
| 6,471,044 | B1 * | 10/2002 | Isaacs .................... B65G 47/682 |
| | | | 198/460.1 |
| 6,603,563 | B1 * | 8/2003 | Gagliano ............... G01B 11/04 |
| | | | 250/559.22 |
| 6,629,018 | B2 | 9/2003 | Mondie et al. |
| 6,903,359 | B2 | 6/2005 | Miller et al. |
| 7,191,895 | B2 | 3/2007 | Zeitler et al. |
| 8,061,506 | B2 * | 11/2011 | Schafer .................. B65G 47/31 |
| | | | 198/444 |
| 8,360,230 | B2 | 1/2013 | Rompe |
| 8,408,380 | B2 | 4/2013 | Doane |
| 9,771,222 | B2 | 9/2017 | Schroader |
| 10,035,661 | B2 | 7/2018 | Bouchard et al. |
| 10,832,429 | B2 | 11/2020 | Blasco Claret et al. |
| 2003/0141165 | A1 | 7/2003 | Reznik et al. |
| 2003/0206305 | A1 | 11/2003 | Gagliano |
| 2009/0173040 | A1 | 7/2009 | Carlson et al. |
| 2013/0135689 | A1 | 5/2013 | Shacham et al. |
| 2017/0167865 | A1 | 6/2017 | Welle et al. |
| 2017/0312789 | A1 | 11/2017 | Schroader |
| 2017/0349385 | A1 | 12/2017 | Moroni et al. |
| 2017/0362036 | A1 | 12/2017 | Hartmann et al. |
| 2019/0011183 | A1 | 1/2019 | Baumert et al. |
| 2019/0236796 | A1 | 8/2019 | Blasco Claret et al. |
| 2021/0272309 | A1 | 9/2021 | Simpson |
| 2021/0374450 | A1 | 12/2021 | Giudiceandrea et al. |

FOREIGN PATENT DOCUMENTS

| | | |
|---|---|---|
| EP | 0370881 A1 | 5/1990 |
| EP | 1148316 A1 | 10/2001 |
| JP | H0713061 U | 3/1995 |
| WO | 2009016614 A2 | 2/2009 |

OTHER PUBLICATIONS

Blasco, A Device and Method for Obtaining Distance Information From Views, Apr. 26, 2018, WO2018072817A1 (Year: 2018).*

WO2021011833A1, Range Sensing Conveyor Package Management System for Measuring and Controlling Density of Parcels on a Conveyor, Jan. 21, 2021, Patent Cooperation Treaty (Year: 2021).*

Supplementary European Search Report, European Patent Application No. 19845075, dated Mar. 28, 2022, European Patent Office.

* cited by examiner

CONVEYOR PACKAGE-FLOW MEASURING SYSTEM

CROSS-REFERENCE TO RELATED APPLICATIONS

This application is a continuation of U.S. patent application Ser. No. 17/262,545, filed Jan. 22, 2021, now U.S. Pat. No. 11,440,744, which is a 371 of International Patent Application No. PCT/US2019/041220, filed Jul. 10, 2019, which claims the benefit of U.S. Provisional Patent Application No. 62/711,736, filed Jul. 30, 2018. The disclosures of those applications are incorporated into this application by reference.

BACKGROUND

The invention relates generally to power-driven conveyors and more particularly to systems for measuring the flow of packages on a conveyor.

In the package-handling industry, individual packages are sorted from a mass flow of randomly oriented and stacked packages on a conveyor. But before the packages can be sorted, they have to be separated from each other, oriented so that each package's identifying indicia can be read, and sorted off the conveyor to the proper destination. The conveyor speed is controlled to prevent both the oversupply and the undersupply of packages to downstream processing, such as separating, orienting, reading, and sorting.

One way to determine the flow rate of a mass flow of packages is by first measuring the depth, or height, of the mass flow of packages along a line across the width of the conveyor. Laser range finders arranged in a row looking down at the conveyor measure the distances down to the top of the mass flow. The distance measurements can be converted into the heights of the mass along the line. The heights are computed from range-finder distance measurements taken at a rate determined by encoder pulses whose rate is proportional to conveyor speed. In that way the measurements are spaced a generally fixed distance along the conveyor in the conveying direction. The height measurements for all the range finders covering a fixed area of a measurement zone downstream of the range finders are added together and multiplied by that area to determine a volume of packages in the measurement zone. The volume is then divided by an average package volume to estimate the number of packages in the measurement zone. The package flow rate is then calculated by multiplying the estimated number of packages by the belt speed and dividing by the fixed length of the measurement zone. In other words the package flow rate is calculated by dividing the estimated number of packages in the zone by the time the packages take to pass through the zone. The estimated flow rate is then used to control the speed of the conveyor. Errors can result from coarse, non-uniform measurements of package height and inaccurate estimates of average package size.

SUMMARY

One version of a conveying system embodying features of the invention comprises a conveyor extending in width from a first side to an opposite second side and advancing packages in a conveying direction, a distance-measuring system measuring the profile of the packages at discrete spots extending across the width of the conveyor to produce a series of sequential profile measurements at each discrete spot, and a controller programmed to execute instructions to compute derivatives of the series of profile measurements for each of the discrete spots and detect edges of the packages from steps in the derivatives of the series of profile measurements.

Another version of a conveying system embodying features of the invention comprises a conveyor extending in a width direction from a first side to an opposite second side and advancing a mass flow of packages in a conveying direction perpendicular to the width direction, an array of distance-measuring sensors disposed above and across the conveyor along the width direction, wherein each of the distance-measuring sensors produces sequential distance measurements representing its distance from the top of the mass flow of packages passing below, and a controller programmed to execute instructions to receive the distance measurements, convert the distance measurements of the distance-measuring sensors into series of profile measurements indicative of the depth of the mass flow below the distance-measuring sensors in a measurement zone of predetermined length, compute derivatives of the series of profile measurements, and estimate the number of packages in the measurement zone from the count of the number of steps in the derivatives of the series of profile measurements.

A method embodying features of the invention for sizing packages on a conveyor comprises: (a) measuring the profile of packages on a conveyor advancing the packages in a conveying direction at discrete spots extending across the width of the conveyor with distance-measuring sensors to produce a series of sequential profile measurements at each discrete spot; (b) computing first derivatives of the series of profile measurements for each of the discrete spots in a programmed controller; and (c) detecting edges of the packages from steps in the first derivatives of the series of profile measurements in the programmed controller.

DETAILED DESCRIPTION

Figure 1:
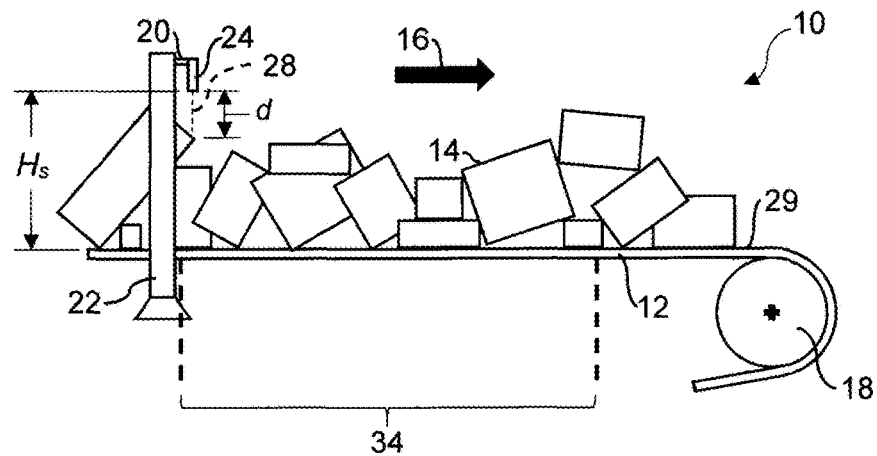
FIG. 1 is a side elevation view of a conveyor system embodying features of the invention for measuring a mass of conveyed packages.

A portion of a conveyor system embodying features of the invention is shown in FIG. 1. The conveyor system 10 comprises a conveyor 12 conveying a mass flow of packages 14 along an upper carryway run in a conveying direction 16. In this example the conveyor 12 is a conveyor belt trained around a drive element 18—pulleys, sprockets, or drum—at one end and an idle element (not shown) at an opposite end. The drive element 18 is part of a conveyor drive that includes a drive shaft and a motor and could also include a transmission belt or a gear train. Instead of a belt conveyor, the conveyor system could alternatively use a powered roller conveyor to advance the mass flow of packages 14 in the conveying direction 16.

Figure 2:
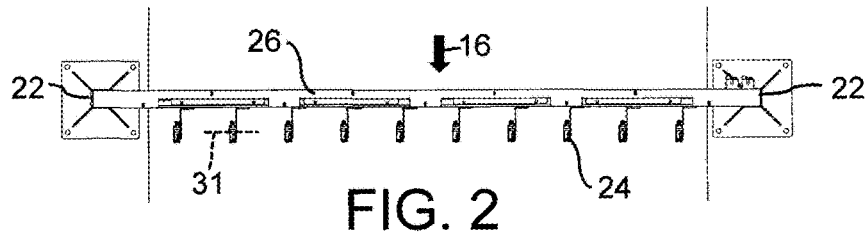
FIG. 2 is a top plan view of an array of laser distance-measuring sensors usable in the conveyor system of FIG. 1.

A distance-measuring system 20 is supported above the conveyor 12 by side supports 22. The system 20 includes an array of laterally spaced distance-measuring sensors 24. The array is linear with equi-spaced sensors 24 as also shown in FIG. 2. The sensors 24 are mounted to a crossbeam 26 whose ends are supported by the side supports 22. One version of distance-measuring sensor 24 is a laser range finder that directs a laser beam 28 at a target and detects the laser light reflected back to measure the distance d from the range finder to the target. Because the height $H_s$ of the sensor 24 above the conveying surface 29 (FIG. 1) is fixed, the height (or depth) of the mass of packages for each distance measurement is given by $H_s$–M, where M is the sensor's measurement of the distance d. (If each distance measurement M for each sensor is subtracted from the height $H_s$ of the sensors above the conveying surface 29, the result is a profile of the depth, or height, of the packages above the conveying surface. If the distance measurements M are used directly, they produce a reversed, but equivalent profile viewed from the opposite side.) To increase gradation without increasing the number of sensors, each range finder could scan its beam laterally to measure the distance to more than one spot as indicated by the dashes 31 in FIG. 2 for one of the sensors. (In FIG. 2 the distance to the target, i.e., to the top of the mass flow of packages, is directed into the page.)

Figure 3:
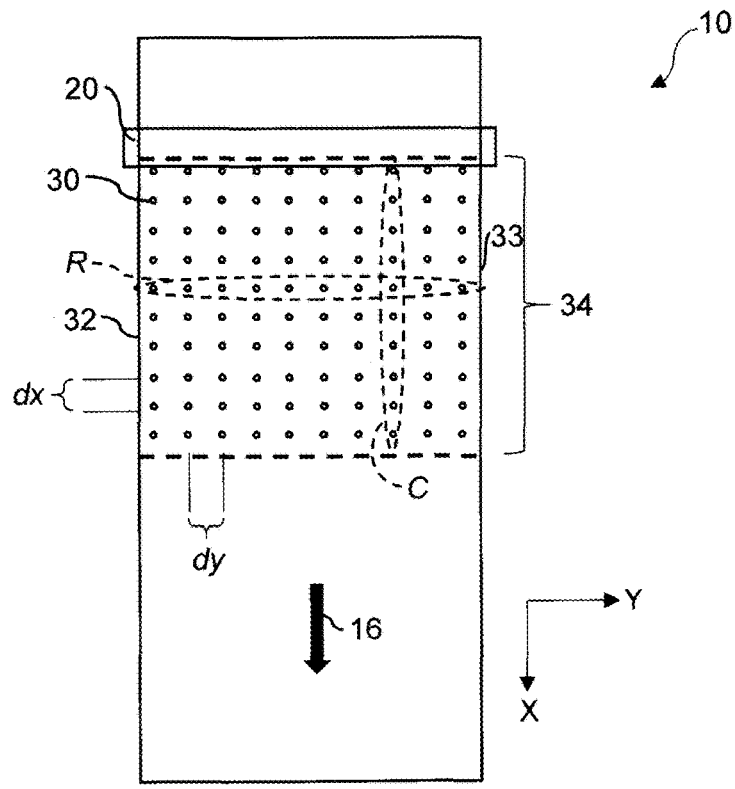
FIG. 3 is a top plan view of the conveyor system of FIG. 1.

As shown in FIG. 3, the distance-measuring sensors 24 illuminate discrete measurement spots 30 across the width of the conveyor 12 from a first side 32 to an opposite second side 33 along a line defined by the linear arrangement of the distance-measuring sensors 24 in the distance-measuring system 20. The lateral line of sensors 24 is read periodically to produce series of measurements, and the series of measurements are saved, for example, in buffers holding enough consecutive sets of measurements to form an array covering a predetermined length of the conveyor 12 in the conveying direction 16 downstream of the distance-measuring sensors 24. The predetermined length defines a measurement zone 34 whose length and width are fixed and whose area is A. The zone 34 is a region of the conveyor in which the number of packages is to be estimated. As FIG. 3 shows, the measurements define series of lateral rows R of measurements spaced apart in distance along the carryway direction 16 (the X direction) in the measurement zone 34. Each row of measurements is spaced apart a distance dx in the conveying direction 16. And the series of rows of measurements also define longitudinal lanes, or columns C, of measurements—each column representing consecutive measurements by one of the distance-measuring sensors— spaced apart in the width direction (the Y direction) by a distance dy equivalent to the sensor or measurement-spot spacing. The area of each measurement spot is thus given by the product dx·dy.

Figure 4:
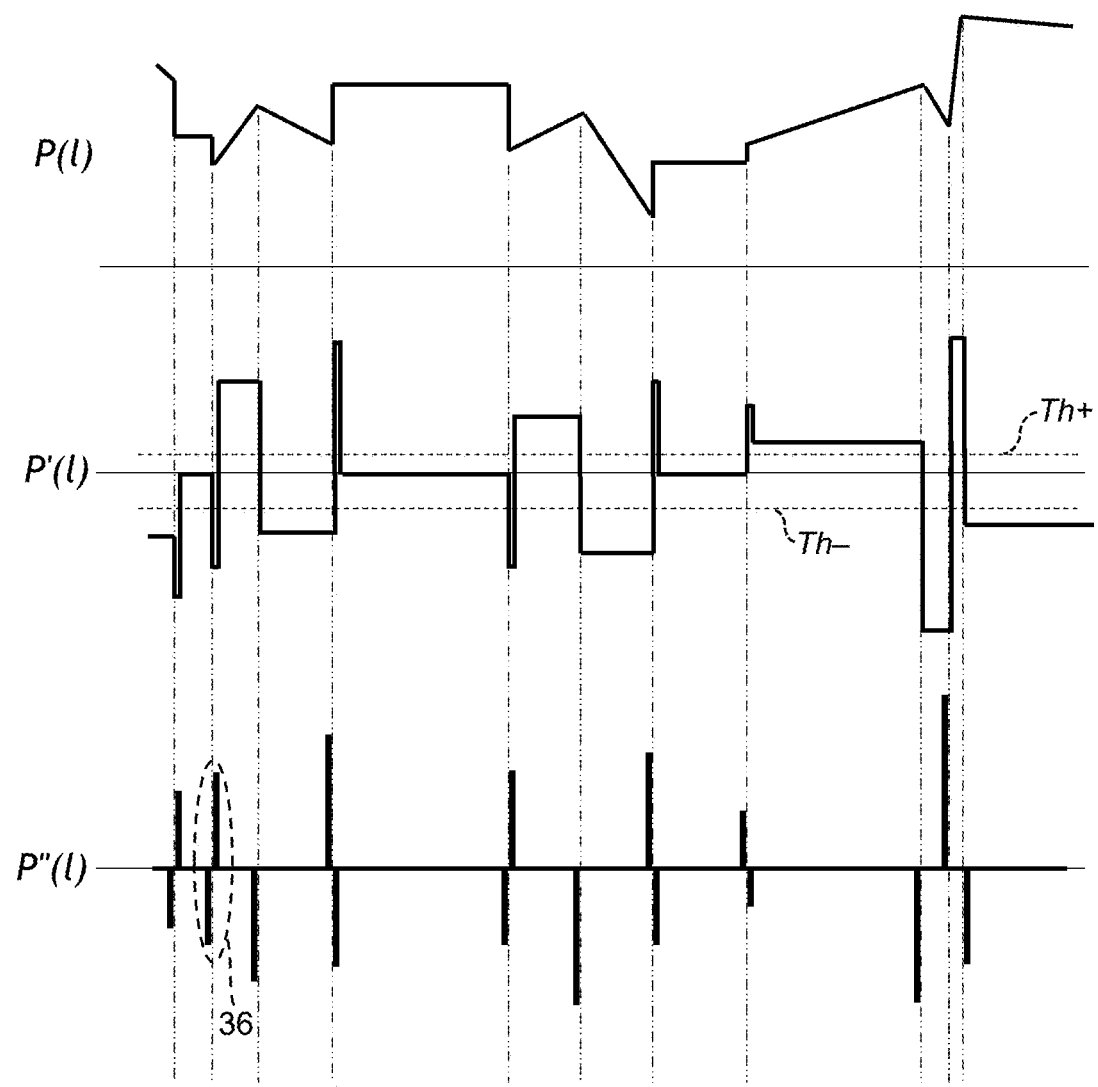
FIG. 4 shows an example profile of a mass flow of packages on a conveyor as in FIG. 1 as measured by one of the distance-measuring sensors as in FIG. 2 along with first and second derivatives of the profile record.

FIG. 4 shows an exemplary height, or depth, profile P(l) produced by one of the distance-measuring sensors measuring the depth of a package flow as in FIG. 1. The profile P(l) is differentiated to produce a first derivative P'(l) of the profile P(l). The first derivative P'(l) may be differentiated to produce a second derivative P''(l) of the profile P(l). The first derivative P'(l) is characterized by a number of steps. Abrupt changes in the slope of the profile P(l) result in the steps in the first derivative P'(l). The abrupt changes indicate package edges, i.e., points on the edges of packages. Because the number of edges is generally proportional to the number of packages, counting the steps in the derivatives of all the sensor profiles provides an estimate of the number of packages in the measurement zone. Examples of ways to estimate the number of packages from the package profile follow.

A first way to estimate the number of packages in the measurement zone is for a conveyor controller 40 (FIG. 5) to execute program instructions in program memory to:
 (1) compute the first derivative P'(l) of the profile P(l);
 (2) count the number of positive-going steps in the first derivatives P'(l) of the profile P(l) that exceed a positive threshold Th+ to produce a first count;
 (3) count the number of negative-going steps in the first derivative of the profile that exceed a negative threshold Th– to produce a second count;
 (4) estimate the number of packages in the measurement zone as the greater of the two counts.

Another way for the controller to estimate the number of packages in the measurement zone is to execute program instructions to:
 (1) compute the first derivative P'(l) of the profile P(l);
 (2) pair up positive-going steps in the first derivatives P'(l) of the profile P(l) that exceed a positive threshold Th+ and negative-going steps in the first derivative that exceed a negative threshold Th–;
 (3) count the number of pairs to produce a first count;
 (4) determine the distance spanned by each pair;
 (5) count the number of instances in which the distance spanned by each pair exceeds a predetermined maximum distance to produce a second count;
 (6) estimate the number of packages in the measurement zone as the sum of the two counts.

The second count represents detections of stacked packages.
The derivatives taken in the previous two examples can be taken in the X, or conveying, direction 16 for each sensor or in the Y, or width, direction from sensor to sensor, or in both directions.

A third way the controller can estimate the number of packages in the measurement zone uses both the X and Y derivatives by:
 (1) computing derivatives of the profile measurements as a first array of inline first derivatives taken in the conveying, or X, direction;
 (2) computing a second array of crossline first derivatives taken across the line of sensors in the width, or Y, direction;
 (3) identifying the corresponding elements in the inline and crossline arrays in which the first derivatives are both positive as positive coincidences;
 (4) identifying the corresponding elements in the inline and crossline arrays in which the first derivatives are both negative as negative coincidences;
 (5) counting the number of positive coincidences to produce a first count;
 (6) counting the number of negative coincidences to produce a second count;
 (7) estimating the number or packages in the measurement zone as the greater of the first and second counts minus the lesser of the first and second counts.

In some instances the profile's second derivative P''(l) may be used in a similar way as the first derivative to estimate the number of packages or to enhance the estimate produced by the first derivative. In the second derivative, package edges are indicated by doublets—positive and negative pairs of pulses that exceed corresponding positive and negative thresholds. The edges can be counted to estimate the number of packages in the measurement zone.

Figure 5:
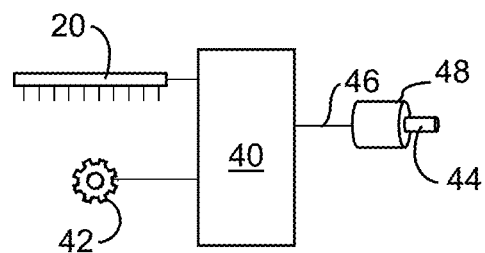
FIG. 5 is a block diagram of a control system usable with the conveyor system of FIG. 1.

As shown in FIG. 5, the conveyor system is controlled by the controller 40, such as a programmable logic controller or a general-purpose programmable computer executing instructions stored in its program memory. The controller 40 receives distance measurements from the distance-measurement system 20. The measurements are sampled at a repetition rate proportional to the conveyor speed, such as from the output of a speed sensor 42 measuring conveyor speed. The speed sensor 42 could be, for example, a shaft encoder mounted on the conveyor belt's drive shaft 44 transmitting pulses at a rate proportional to conveyor speed. In that way samples are taken at equal spatial intervals on the belt to ensure that the length of the measurement zone is constant from sample to sample. From the distance measurements the controller 40 derives their derivatives and estimates the number of packages in the measurement zone. Because the number of packages in the measurement zone at any time is proportional to the flow rate, the controller 40 adjusts the speed of the belt with a speed signal 46 sent to the conveyor drive 48. As the number of packages in the measurement zone increases, the controller 40 reduces the conveyor speed accordingly; and as the number of packages decreases, the controller increases the speed. In that way the flow rate is generally held constant.

As one example of how the controller adjusts the conveyor speed, consider a conveyor system in which an infeed conveyor laden with a mass flow of packages feeds packages to conveyors downstream that separate packages and include a gapping conveyor that imposes minimum gaps of length g between consecutive separated packages. If the gapping conveyor is the pacing item in the conveyor system and its speed $v_g$ is fixed, the maximum package rate $r_p$ for packages of size s is given by $r_p=v_g/(s+g)$. The controller adjusts the speed of the infeed conveyor to $v=r_p(L/N_p)$, where L is the length of the measurement zone and $N_p$ is the estimated number of packages in the measurement zone. Thus, the speed v of the infeed conveyor is set to a value inversely proportional to the estimated number of packages $N_p$ in the measurement zone. The infeed conveyor speed v is limited to a range between a predetermined minimum allowed speed $v_{min}$ and a predetermined maximum allowed speed $v_{max}$.

Figure 6:
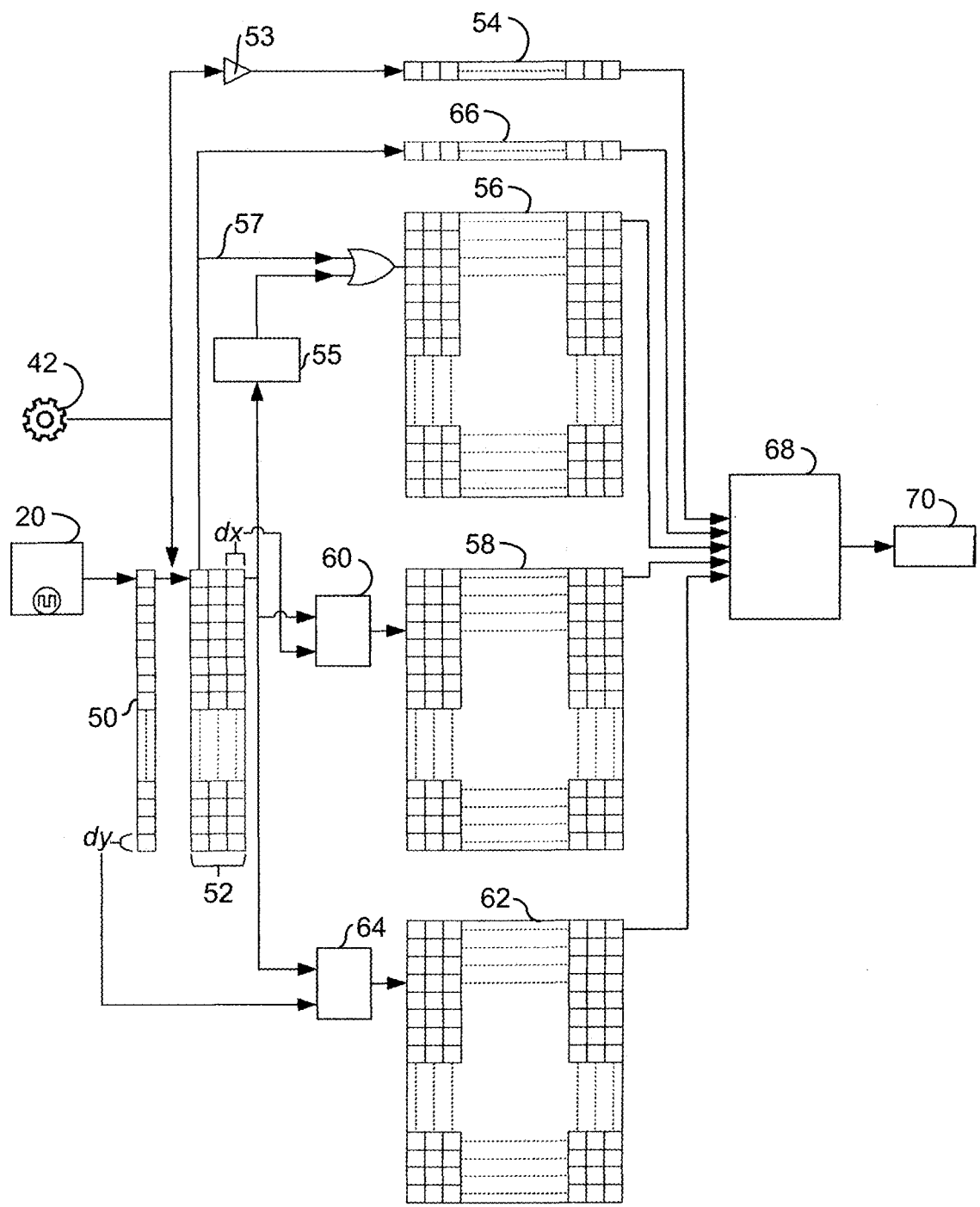
FIG. 6 is a block diagram of one version of the flow of measurement data in the control system of FIG. 5.

FIG. 6 illustrates one way in which the controller estimates the number of packages in the measurement zone. In this example implementation, the distance-measuring sensors 20 make periodic distance measurements along the line. The measurements may be taken simultaneously across all sensors or asynchronously. Based on the speed measured by the speed sensor 42, the controller samples the outputs of the distance-measuring sensors at a variable repetition rate. The most recent distance measurements 50 are read and transferred into a line buffer 52 in the controller's data memory. As a new set of sequential distance measurements is clocked into the line buffer 52, the older sets are shifted toward the end of the buffer and the oldest set is shifted out. A counter 53 counts encoder pulses to produce a time stamp 54 associated with the clocking of each set of distance measurements into the line buffer 52. The multiple sets of measurements in the line buffer are used to filter the raw distance measurements in a low-pass digital filter 55. The array of filtered measurements is stored in a height-map buffer 56 whose length corresponds to the length of the measurement zone. As an alternative to the filtered measurements, the unfiltered raw distance measurements 57 may be used to populate the height-map buffer 56 if the signal-to-noise ratio of the measurements is high enough. Inline first derivatives of the distance measurements are computed and clocked through an inline-derivative buffer 58 as an array. The inline derivative is computed by an inline differentiator 60. The differentiator 60 divides the difference $(M^n_i-M^n_{i-1})$ between consecutive distance measurements M for each measurement spot n by the distance dx between consecutive spots i, i−1 in the conveying direction, i.e., along each column C of measurements. In a similar way crossline derivatives of the profile are computed and clocked through a crossline buffer 62. A crossline differentiator 64 computes derivatives across a single set of measurements i in the width direction by dividing the difference between the distance measurements $(M^n_i-M^{n+1}_i)$ at laterally consecutive spots n, n+1 across each row R by the distance dy between spots. Together, the inline and crossline derivatives produce a three-dimensional gradient of the profile. Both differentiators 60, 64 could also convert the distance measurements into actual depth (height) measurements by applying appropriate scale factors and functional relationships. But whether scaled and converted or not, the distance measurements still represent the profile of the mass of packages in the measurement zone. And dividing the differences by dy and dx is optional if both are constants and, thus, scale factors. The controller also computes a volume vector 66 for each line as the product of the area of the measurement zone and the sum of the depth measurements of all the sensors along the line. The sum of all the volume vectors across the length of the measurement zone, i.e., the integral of the profile, provides an estimate of the number of packages in the zone.

The time stamp 54, the volume vector 66, the height map 56, the inline-derivative map 58, and the crossline-derivative map 62 are all inputs to an estimation process 68 that produces an estimate 70 of the number of packages in the measurement zone. The estimate is updated at the variable repetition rate set by the speed sensor 42. The estimation process 68 can use only the inline derivative as disclosed previously or can use both the inline and crossline derivatives to estimate the number of packages. If one of the inline-only methods is used, the crossline buffer 62 and the crossline differentiator 64 are not necessary. If the second derivative is used, the inline buffer 58 or the crossline buffer 62 would feed inline and crossline second derivative buffers (not shown) that would feed the estimation process.

The time stamp 54 is used to synchronize the data. The volume vector 66 is summed with the previous volume vectors that span the measurement zone to produce an overall package volume V from the integrated profile that can be used to refine the derivative-based estimate. And if certain characteristics of the mass of packages are known a priori, such as actual physical dimensions or empirically determined relationships between estimated package count and actual package count, the estimates could be further refined with that a priori knowledge.

Figure 7:
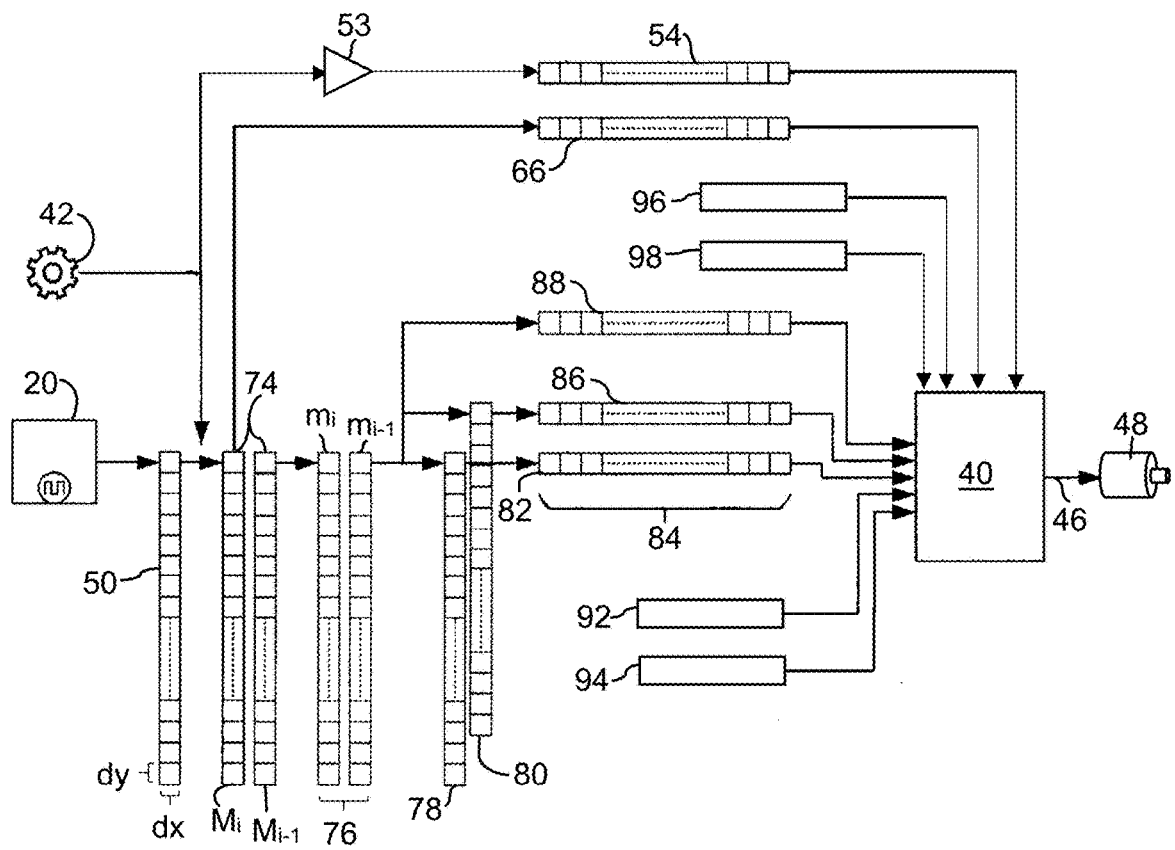
FIG. 7 is a block diagram of another version of the flow of measurement data in the control system of FIG. 5.

FIG. 7 illustrates an alternative algorithm executed by the controller 40 to estimate the number of packages in the measurement zone. As in FIG. 6, the most recent set of distance measurements 50 from the line of sensors 20 is sampled and transferred at a rate set by the encoder 42 into a line buffer 74 in the controller's data memory. The line buffer 74 contains the most recent two sets of measurement data $M_i$, $M_{i-1}$, which represent a two-line slice of the package-height profile. The difference $(M_i-M_{i-1})$ between the two measurement sets is computed to derive a set of slope values $m_i=M_i-M_{i-1}$, which are transferred to a slope buffer 76. Because the inline measurement-spot spacing dx is a constant, it does not have to be used as a divisor in computing the slope values $m_i$, but it could be. The slope values $m_i$ are equivalent to the first derivatives of the measurement values $M_i$. A positive counter acting on the slope buffer's output values increments the counts $K_{i-1}(m^+)$ for each measurement spot in a positive accumulator 78 by one if the slope value $m_{i-1}$ is positive and exceeds a positive slope threshold Th+ and the immediately preceding slope value $m_{i-2}$ does not exceed the threshold. Those criteria identify a positive step in the slope, or first derivative, which indicates the detection of a package edge. Similarly, a negative counter acting on the slope buffer's output values increments the counts $K_{i-1}(m^-)$ for each measurement spot in a negative accumulator 80 by one if the slope value is more negative than a negative slope threshold Th− and the immediately preceding slope value $m_{i-2}$ is not. Those criteria identify a negative step in the slope, or first derivative, which indicates the detection of a package edge. Thus, the positive and negative accumulators 78, 80 are incremented only when the positive or negative slope values cross positive and negative thresholds Th+, Th−. The sum of the positive counts $\Sigma K_{i-1}(m^+)$ in the positive accumulator 78 for each set of slope values $m_{i-1}$ is computed and transferred into a positive-sum vector array 82 whose length 84 represents the length of the measurement zone. The sum of the negative counts $\Sigma K_{i-1}(m^-)$ in the negative accumulator 80 for each set of slope values is computed and transferred into a negative-sum vector array 86 whose length 84 represents the length of the measurement zone. The step-size sum of the absolute values $S=\Sigma(|m^+_{i-1}|+|m^-_{i-1}|)$ of all the slope values $m_{i-1}$ that resulted in the incrementing of either a positive or a negative count is computed for each set of values and clocked into a slope-magnitude vector 88 whose length 84 is the same as that of the sum vectors 82, 86.

The controller 40 executes processes according to program instructions stored in its program memory to:
(a) estimate the number of packages $N_p$ in the measurement zone as $N_p=\min(K^+, K^-)/2$, where $K^+$ is the sum of all the counts in the positive-sum vector 82, $K^-$ is the sum of all the counts in the negative-sum buffer 86, and min(a, b) is the minimum function that returns the lesser value of its arguments a, b;
(b) compute the adaptive positive and negative thresholds Th+, Th− as $\pm S/[2(K^+ + K^-)]$;
(c) estimate an average package size s as $s=\sqrt{2A/\max(K^+,K^-)}$, where A is the area of the measurement zone and max(a, b) is the maximum function that returns the greater value of its arguments a, b;
(d) estimate a package flow rate $r_p$ as $r_p=v_g/(s+g)$, where g is the minimum gap setting 92 between packages on a gapping conveyor downstream of the sensor array 20 as set by user input and $v_g$ is the gapping conveyor speed setting 94; and
(e) compute an infeed conveyor speed v as $v=r_p(L/N_p)$, where L is the length of the measurement zone, limit the infeed conveyor speed v to a range between a predetermined minimum allowed speed $v_{min}$ and a predetermined maximum allowed speed $v_{max}$, and send the corresponding speed signal 46 to the infeed conveyor drive 48.

Other user inputs that could be used include a desired package flow rate 96 and an average package volume 98 that the controller 40 can use in refining the estimate of the number of packages or adjusting the infeed conveyor speed.

Figure 8:
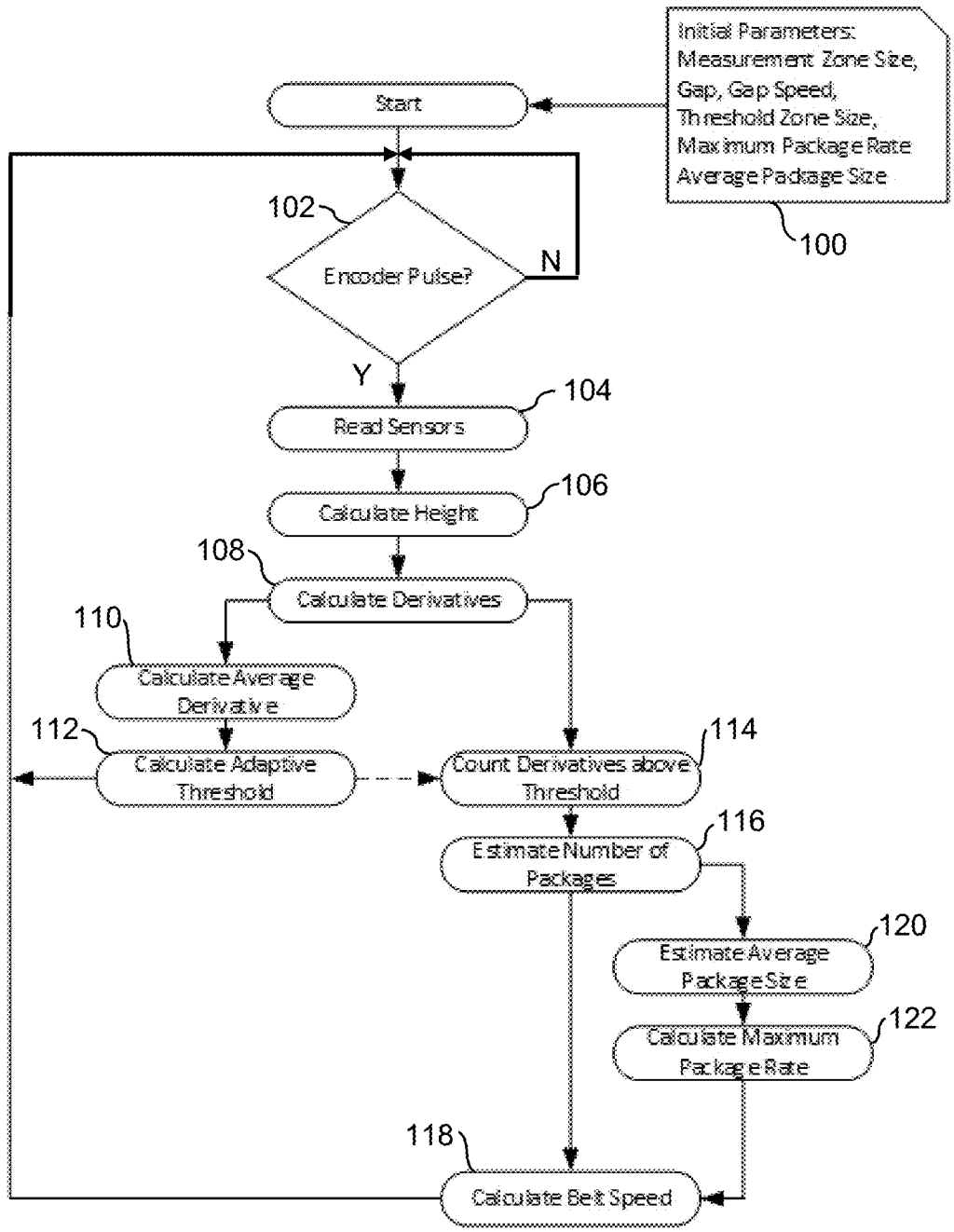
FIG. 8 is a flowchart of one version of a package flow-measuring and conveyor speed-control algorithm for use with a conveyor system as in FIG. 1 and a control system as in FIG. 5.

FIG. 8 is a flowchart of an exemplary control algorithm of program steps executed by the controller. Initial parameters 100, such as the length of the measurement zone, the minimum package gap, the speed of the gapping conveyor, the maximum allowed package flow rate, and the average package size, may be predetermined fixed values or user-inputted settings. The initial parameters are used in subsequent calculations. The controller waits for an encoder pulse at step 102. When a pulse is received, the controller reads 104 the distance-measurement sensors. From those distance readings, the controller calculates 106 the height of the mass of packages along the sensor line. At step 108 the controller calculates the derivatives of the height measurements for each sensor. The controller can optionally compute adaptive thresholds at step 112 from an average of the magnitudes of the recent derivatives that indicate package edges detected by the controller at step 110. As an alternative, the controller can use predetermined fixed thresholds or user-inputted threshold settings. The controller counts the number of positive and negative threshold crossings by the derivatives at step 114 and, from those counts, estimates the number of packages in the measurement zone at step 116. And from that estimate the controller can compute a speed for the infeed conveyor at step 118 and send a corresponding speed signal to the conveyor drive to adjust the conveyor speed appropriately. The controller can also estimate an average package size at step 120 from the area of the measurement zone and the positive and negative counts. And the controller can calculate the maximum allowable package flow rate from the average package size, the speed of the gapping conveyor, and the minimum inter-package gap at step 122. The maximum package flow rate can be used with the estimated number of packages and the length of the measurement zone to set the belt speed at step 118.

Although features of the invention have been described in detail with reference to specific versions, other versions are possible. For example, distance-measuring sensors other than laser rangefinders could be used. Some other distance-measuring sensor systems include sonar, ultrasonic sensors, LIDAR, radar, millimeter-wave sensors, stereoscopic cameras, time-of-flight sensors, multi-angle photogrammetry, and mechanical range finders, such as dancer rollers. And the sensors may be positioned wherever practicable. As other examples, the thresholds Th+, Th− can be adaptive as described, user inputs, or predetermined, fixed values. Or the gapping conveyor speed $v_g$ and the minimum gap g settings can be predetermined, fixed values rather than user inputs. And, instead of computing package size s, it can be a user input setting or a predetermined value. Or the gapping conveyor speed $v_g$ can be determined from a speed sensor. And it would be possible to refine the estimated number of packages $N_p$ with an empirically predetermined fudge factor or an adaptive fudge factor based on actual or estimated package size s or an estimated volume V of packages in the measurement zone. The distance-measuring sensors could also be used to determine the outlines of singulated or separated packages by detecting their edges from the derivatives of the sensors' depth measurements. And once the outline of a package is determined, the package's face and its corners can be recognized and its centroid can be computed. So, as these few examples suggest, the spirit and scope of the claims should not be limited to the versions described in detail.

Glossary

| Term | Meaning |
|---|---|
| $H_s$ | height of distance-measuring sensor array above the conveying surface |
| d | distance from sensors to the top of the packages |
| M | distance-measurement-sensor measurement |
| dx | inline measurement spot size or spacing |
| dy | crossline measurement spot size or spacing |
| P(l) | package profile of crossline l along the measurement zone |
| P'(l) | $1^{st}$ derivative of P(l) |
| P''(l) | $2^{nd}$ derivative of P(l) |
| Th+ | positive threshold |
| Th− | negative threshold |
| g | minimum package gap on the gapping conveyor downstream of the sensor array |
| $v_g$ | speed of the gapping conveyor |
| s | package size |
| $r_p$ | package flow rate |
| L | length of the measurement zone |
| A | area of the measurement zone |
| $N_p$ | estimated number of packages in the measurement zone |
| v | infeed conveyor speed |
| $v_{min}$ | infeed conveyor speed lower limit |
| $v_{max}$ | infeed conveyor speed upper limit |
| i | measurement spot inline index |
| n | measurement spot crossline index |
| V | volume of packages in the measurement zone |
| m | slope, or $1^{st}$ derivative, of the measurements M |
| $K^+$ | count of positive steps in the slope in the measurement zone |
| $K^-$ | count of negative steps in the slope in the measurement zone |
| S | sum of the absolute values of the slope steps in the measurement zone |

What is claimed is:

1. A conveyor system comprising:
    a conveyor extending in width from a first side to an opposite second side and advancing packages in a conveying direction;
    a distance-measuring system measuring the profile of the packages at discrete spots extending across the width of the conveyor to produce a series of sequential profile measurements at each discrete spot;
    wherein the distance-measuring system includes distance-measuring sensors and a line defined by a linear arrangement of the distance-measuring sensors;
    wherein the series of sequential profile measurements at each discrete spot cover a predetermined number of the discrete spots corresponding to the length of a measurement zone extending downstream of the line in the conveying direction;
    a controller programmed to execute instructions to:
        (a) compute derivatives of the series of sequential profile measurements for each of the discrete spots;
        (b) detect edges of the packages from steps in the derivatives of the series of sequential profile measurements;
        (c) count the number of the steps in the derivatives of the series of sequential profile measurements; and
        (d) estimate the number of packages in the measurement zone from the count of the number of steps in the derivatives of the series of sequential profile measurements of all the discrete spots.

2. A conveyor system as claimed in claim 1 comprising a speed sensor producing speed measurements of the speed of the conveyor in the conveying direction and wherein the controller is programmed to repeat steps (a) through (d) at a repetition rate proportional to the speed of the conveyor.

3. A conveyor system as claimed in claim 1 wherein the derivatives are inline derivatives of the series of sequential profile measurements for each of the discrete spots taken in the conveying direction.

4. A conveyor system as claimed in claim 1 wherein the derivatives are crossline derivatives of the discrete spots taken along the line across the width of the conveyor.

5. A conveyor system as claimed in claim 1 wherein the derivatives are first derivatives.

6. A conveyor system as claimed in claim 1 wherein the derivatives are second derivatives.

7. A conveyor system as claimed in claim 1 wherein an array of the distance-measuring sensors is disposed above and across the conveyor, wherein each distance-measuring sensor measures the profile of the mass flow of packages at one of the discrete spots.

8. A conveyor system as claimed in claim 1 wherein each distance-measuring sensor scans across the conveyor along a length of the line to take the profile measurements at more than one of the discrete spots.

9. A conveyor system as claimed in claim 1 wherein the controller is programmed to execute instructions to determine the outlines of individual singulated packages from the edges detected from the derivatives.

10. A conveyor system as claimed in claim 1 wherein the controller is programmed to execute instructions to compute the centroid of individual singulated packages from the edges detected from the derivatives.

11. A conveyor system as claimed in claim 1 wherein the conveyor advances the packages in a mass flow in the conveying direction and wherein the derivatives are first derivatives.

12. A conveyor system as claimed in claim 11 comprising a conveyor drive driving the conveyor in the conveying direction, wherein the controller sends a speed signal to the conveyor drive to drive the conveyor at a speed inversely proportional to the estimated number of packages in the measurement zone.

13. A conveyor system as claimed in claim 11 wherein the controller is programmed to:
    (e) count the number of positive-going steps in the first derivatives that exceed a positive first threshold to produce a first count;
    (f) count the number of negative-going steps in the first derivatives that exceed a negative second threshold to produce a second count;
    (g) estimate the number of packages in the measurement zone as the greater of the first count and the second count.

14. A conveyor system as claimed in claim 11 wherein the controller is programmed to:
    (e) pair up positive-going steps in the first derivatives that exceed a positive first threshold and negative-going steps in the first derivatives that exceed a negative second threshold;
    (f) count the number of pairs to produce a first count;
    (g) determine the distance spanned by each pair;
    (h) count the number of instances in which the distance spanned by each pair exceeds a maximum distance to produce a second count;
    (i) estimate the number of packages in the measurement zone as the sum of the first count and the second count.

15. A conveyor system as claimed in claim 11 wherein the controller is programmed to:
    (e) compute the first derivatives of the series of sequential profile measurements as a first array of inline first derivatives taken in the conveying direction and a second array of crossline first derivatives taken along the line across the width of the conveyor;

(f) identify the corresponding elements in the first and second arrays in which the first derivatives are both positive as positive coincidences;

(g) identify the corresponding elements in the first and second arrays in which the first derivatives are both negative as negative coincidences;

(h) count the number of positive coincidences to produce a first count;

(i) count the number of negative coincidences to produce a second count;

(j) estimate the number of packages in the measurement zone as the greater of the first and second counts minus half the lesser of the first and second counts.

16. A conveyor system as claimed in claim 1 wherein the controller is programmed to:

(e) estimate the volume of the packages in the measurement zone from the series of sequential profile measurements and the area of the measurement zone;

(f) refine the estimate of the number of packages in the measurement zone as a function of the estimated volume.

17. A conveyor system as claimed in claim 1 wherein the controller is programmed to compute adaptive positive and negative thresholds to which the derivatives are compared to identify crossings of the thresholds that indicate the steps in the derivatives.

* * * * *